UNITED STATES PATENT OFFICE.

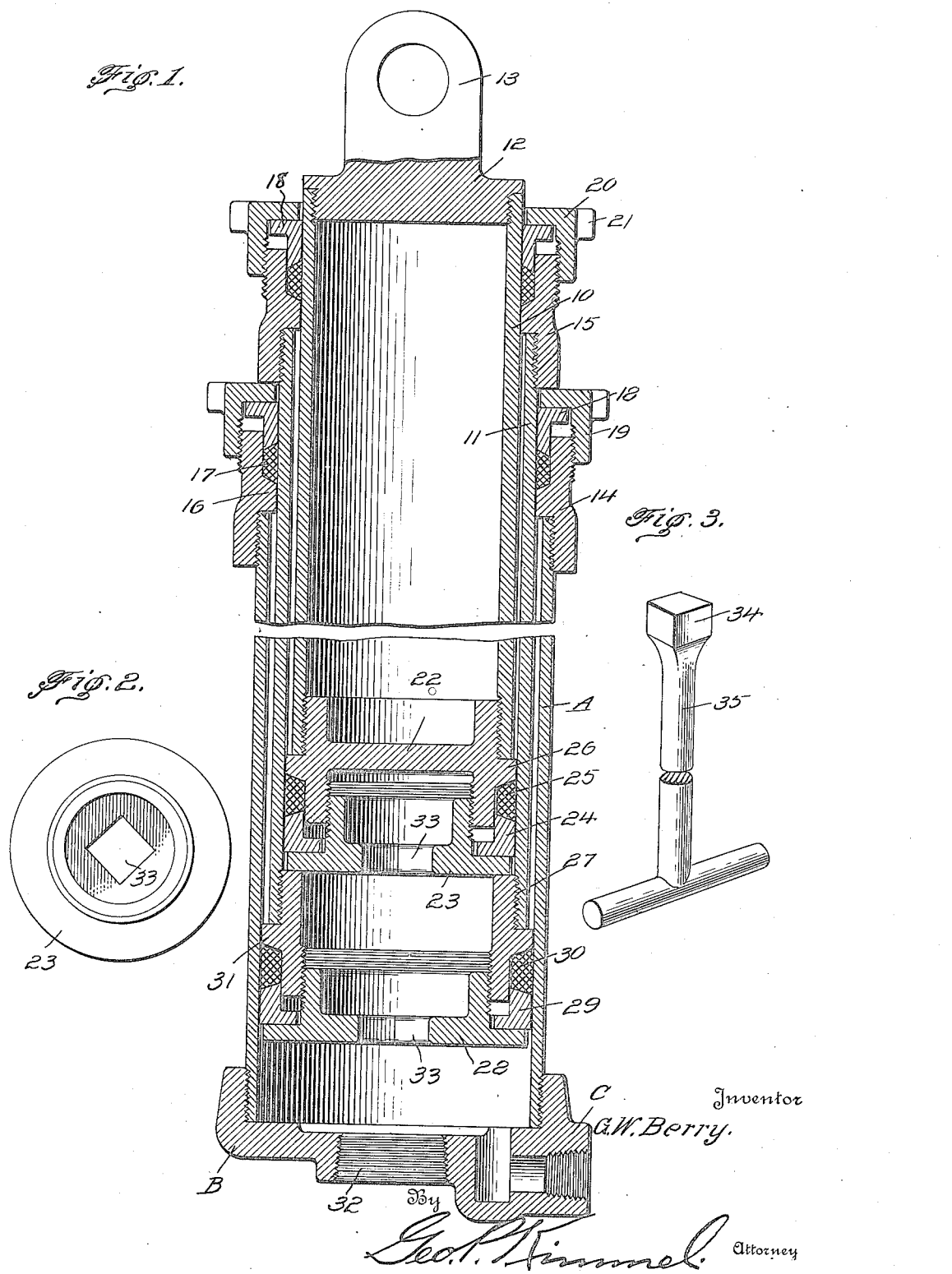

GEORGE W. BERRY, OF ERIE, PENNSYLVANIA.

PACKING FOR HYDRAULIC JACKS.

1,424,233.  Specification of Letters Patent.  Patented Aug. 1, 1922.

Application filed February 23, 1921. Serial No. 447,299.

*To all whom it may concern:*

Be it known that I, GEORGE W. BERRY, a citizen of the United States, residing at Erie, in the county of Erie and State of Pennsylvania, have invented certain new and useful Improvements in Packings for Hydraulic Jacks, of which the following is a specification.

The invention relates to a packing construction and more particularly to the class of quick adjustable packing glands, heads or rings designed especially for use in hydraulic or other telescopic jacks, pumps or the like.

The primary object of the invention is the provision of a packing construction of this character, wherein the single or telescopic pistons in the hydraulic or other telescopic jacks, pumps or the like need not be removed from the cylinder of the latter, when occasion arises for the tightening of the packing in each or several of the pistons, as adjustment can be had with dispatch, without disassembling any of the parts of the jack, pump or the like.

Another object of the invention is the provision of a packing construction, wherein the packing for the piston can be expanded in a convenient manner without removing any one or all of the pistons from the jack, pump or the like, the cylinder of the latter being of novel construction to permit easy access thereto for the adjustment of the packing of the pistons working therein so as to enable the adjustment of the packing with dispatch and avoiding the disassemblage of any of the parts of the jack, pump or the like.

A further object of the invention is the provision of a packing construction of this character, wherein the packing rings are carried at the inner ends of the pistons of the hydraulic telescopic jack in a novel manner so as to assure the tight fitting interiorly of the cylinder of the jack and also to enable quick and easy adjustment of the packing when the occasion requires, the mounting of the packing interiorly of the jack being of novel form.

A still further object of the invention is the provision of a packing construction of this character, which possesses simplicity, durability, and efficiency, capable of being readily adjustable when the occasion requires, enabling quick and easy assemblage, as well as avoiding the necessity of disassemblage of any of the parts of the jack or other like structure when it is required to tighten the packing interiorly thereof, and also which is inexpensive to manufacture and install.

With these and other objects in view, the invention consists in the features of construction, combination and arrangement of parts, as will be hereinafter fully described, illustrated in the accompanying drawing and pointed out in the claims hereunto appended.

In the accompanying drawing:

Figure 1 is a vertical longitudinal sectional view through a hydraulic telescopic jack showing the packing gland or packing construction made and assembled in accordance with the invention.

Fig. 2 is a detail plan view of one of the packing heads removed from the piston.

Fig. 3 is a perspective view of the tool used for the adjustment of the packing gland or construction.

Similar reference characters indicate corresponding parts throughout the several views in the drawing.

Referring to the drawing in detail, A designates generally the outer cylinder of the hydraulic jack having at its lower end a removable bottom cap, B, formed at its periphery with an inlet nipple C which also serves as an outlet nipple and through the same is adapted to be delivered the fluid into the cylinder A as well as the discharge of the fluid for the operation of the jack as will hereinafter be obvious from the detail description.

Working within the cylinder A of the jack is a series of pistons comprising the inner and outer tubes 10 and 11, the latter being telescoped in the cylinder A while the tube 10 is telescoped in the tube 11 for telescopic movement in the working of the jack for hoisting purposes. Closing the outer end of the tube 10 is a removable coupler 12 in the form of an eye 13 for the pivotal connection thereof with a part to be hoisted in the operation of the jack.

Exteriorly threaded on the upper outer end of the cylinder A and outer piston tube 11 are detachable packing gland collars 14 and 15, respectively, each formed with an internal flange 16 constituting a seat for packing 17 against which works a follower ring 18, each being slidably fitted in the respective collars 14 and 15. Mounted upon the collars 14 and 15 are adjustable rings 19 and 20, respectively, which are externally threaded thereon and act directly against the follower ring 18 slidably fitted in the collars 14 and 15 so that the packing 17 can be expanded under the action of the follower rings 18 so as to afford a fluidtight joint between the tubes 10 and 11 and the cylinder A of the jack as will be clearly apparent.

The adjusting rings 19 and 20 are formed with peripheral external protuberances 21 to enable a firm grip to be had thereon when it is required to turn the adjustable ring for action upon the followers 18 in the collars 14 and 15 for the tightening or loosening of the packing as the occasion may require. These adjusting rings 19 and 20 can be manually turned without the jack for the setting of the packing 17 when subjected to wear for assuring a tight joint between the pistons and the cylinder of the jack.

Detachably mounted in the inner end of the inner piston or tube 10 is a head 22 which closes the inner end of said inner piston or tube 10 and has internally threaded therein an adjusting cap 23 which works against a follower ring 24 to act upon a packing 25 engaged upon a packing seat 26 formed exteriorly on the head so as to provide a fluidtight joint between the tubes 10 and 11 at the inner end of the inner piston 10 as will be clearly apparent.

Internally threaded in the inner end of the outer tube 11 is a collar 27 which has internally threaded therein an adjusting cap 28 working against a follower ring 29 acting upon a packing 30 which is engaged upon an external seat 31 formed on the collar 27 so as to provide a fluidtight joint between the tube 11 and the cylinder A of the jack.

It will be apparent that on the adjustment of the adjustable caps 23 and 28, respectively, the packings 25 and 30 can be expanded interiorly of the cylinder A of the jack to assure a fluidtight joint between the piston and the cylinder A.

Formed in the bottom cap B of the cylinder A is a screw threaded plug opening or hole 32 for accommodating a removable plug, while formed in each of the adjustable caps 23 and 28 in longitudinal axial alinement with the hole or opening 32 is a flat sided hole or opening 33, in this instance the same being shown substantially square-shaped, although it may be of any other desirable shape for the engagement therein of the locking end 34 with an adjusting tool or wrench 35 shown in detail in Fig. 3 of the drawing, while the detail construction of the adjustable cap is shown in Fig. 2 of the drawing.

It will be apparent that on removing the plug from the hole or opening 32 in the bottom cap B of the cylinder A, the tool or wrench 35 can be passed through said hole or opening 32 for engagement in either of the holes or openings 33 in the respective adjusting caps 23 and 28 for the tightening of said cap to adjust the packing 25 or 30, without necessitating the removal of the pistons or tubes 10 and 11 from the cylinder A of the jack. It will be obvious that the packings 25 and 30 can be expanded within the cylinder A of the jack without disassembling the latter or the removal of either of the tubes 10 and 11 in the use of the tool or wrench 35 by bringing the same into engagement with either the caps 23 or 28 after passing the said tool or wrench 35 through the hole or opening 32 in the bottom cap B of the cylinder A of the jack.

The operation of the jack is effected in the usual well known manner and such operation is of no importance relative to the invention hereinbefore set forth as detail description of this operation has been omitted.

It is thought that the manner of adjustment of the packing construction and the details thereof will be clearly understood and therefore a more extended explanation has been omitted.

However it is to be borne in mind that the packing construction as herein set forth is equally adaptable to pumps or other construction employing movable pistons requiring the use of packing, therefore the present embodiment of the invention is not restricted to the use thereof in a jack of the hydraulic or telescopic type. Furthermore changes, variations and modifications may be made in the invention as fall properly within the scope of the appended claims, without departing from the spirit of the invention or sacrificing any of its advantages.

What is claimed is:

1. The combination with relatively movable parts, packing glands arranged exteriorly and interiorly of said parts, and means for adjusting the interiorly arranged glands from without said parts without separation of the latter.

2. A device of the character described, having in combination, a plurality of telescopic movable members, a housing therefor having an opening in its bottom, adjustable packings carried by said members and accessible through the opening in said bottom to permit adjustment of the packings on the insertion of an implement through the opening.

3. In a device of the class described, having in combination, a telescopic movable member, a housing therefor having a bottom opening, adjustable packing means carried by the member and accessible and adjustable by an implement when inserted through said opening.

4. Relatively movable nested parts, packing arranged between the parts, and means for adjusting the packing from within the nested parts without separation of the parts.

5. Relatively movable nested parts of tubular form, packing between the parts inward from the ends thereof, and means for adjusting the packing without separation of the parts.

6. Relatively movable nested parts of tubular form having complemental end portions stepped one inward from the other, packing arranged between the parts adjacent the inner stepped ends thereof, and means for adjusting the packing without separation of the parts.

7. Relatively movable nested parts of tubular form having complemental end portions stepped one inward from the other, packing arranged between the parts adjacent the inner stepped ends thereof, and means for adjusting the packing without separation of the parts and from a point exteriorly thereof.

8. Relatively and longitudinally nested parts of tubular form having complemental end portions stepped one inward from the other, packing arranged between the parts adjacent the inner stepped ends thereof, and means for adjusting the packing without separation of the parts and from a point exteriorly thereof.

9. A plurality of relatively movable nested parts, packings arranged between the opposed walls of the parts, and means for adjusting the packings independently one with respect to the other from within the nested parts without separation of the parts and from a point exteriorly thereof.

10. A plurality of relatively movable parts of tubular form having complemental end portions thereof stepped one inward from the other, packings arranged between the opposed walls of the parts adjacent the inner stepped ends thereof, and means for adjusting the packings independently one with respect to the other without separation of the parts and from a point exteriorly of one end thereof.

11. A plurality of relatively movable parts of tubular formation nested relative to each other and having complemental end portions thereof stepped one inward from the other, packing glands carried at the inner stepped ends of the parts, packing within the glands, and means for adjusting the glands for varying the compression of the packing carried thereby without separation of the parts.

12. Relatively and longitudinally nested parts of tubular form having complemental end portions stepped one inward from the other, packing arranged between the parts adjacent the inner stepped ends thereof, and means insertable from one end of the parts for adjusting the glands one independently of the other for varying the compression of the packing carried thereby.

In testimony whereof, I affix my signature hereto.

GEORGE W. BERRY.